(12) United States Patent
Byun (10) Patent No.: US 10,963,399 B2
(45) Date of Patent: Mar. 30, 2021

(54) MEMORY SYSTEM, COMPUTING APPARATUS AND OPERATION METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/592,359

(22) Filed: Oct. 3, 2019

(65) Prior Publication Data

US 2020/0301852 A1  Sep. 24, 2020

(30) Foreign Application Priority Data

Mar. 18, 2019  (KR) .................. 10-2019-0030315

(51) Int. Cl.
*G06F 12/109* (2016.01)
*G06F 12/126* (2016.01)

(52) U.S. Cl.
CPC .......... *G06F 12/126* (2013.01); *G06F 12/109* (2013.01); *G06F 2212/305* (2013.01)

(58) Field of Classification Search
CPC .. G06F 12/109; G06F 12/126; G06F 12/0871; G06F 12/02; G06F 12/0868; G06F 2212/305
See application file for complete search history.

(56) References Cited

U.S. PATENT DOCUMENTS

| 2014/0351521 A1* | 11/2014 | Kudo ................. G06F 12/0868 711/125 |
| 2017/0147260 A1* | 5/2017 | Byun .................. G06F 3/0659 |
| 2018/0067650 A1* | 3/2018 | Hayakawa ........... G06F 3/0685 |
| 2019/0087125 A1* | 3/2019 | Matsumoto ......... G06F 12/0868 |

FOREIGN PATENT DOCUMENTS

| KR | 1020170081118 | 7/2017 |
| KR | 1020180016679 | 2/2018 |

* cited by examiner

*Primary Examiner* — Ernest Unelus
(74) *Attorney, Agent, or Firm* — IP & T Group LLP (57) ABSTRACT

A memory system may include a storage device and a controller. The storage device may include a non-volatile memory device. The controller may include a device memory. The controller may control operations of the non-volatile memory device in accordance with a request of a host device. wherein the controller includes a map data management circuit configured to cache one or more segments from a plurality of map segment groups stored in the storage device, each segment having information including a reference count and mapping relationships between logical addresses and physical addresses, detect, among the one or more cached segments, an upload target segment in which the reference count is greater than a predetermined count and transmit, when a predetermined number or greater of upload target segments are detected within a first map segment group, the predetermined number or greater of upload target segments to the host device.

17 Claims, 11 Drawing Sheets

MEMORY SYSTEM, COMPUTING APPARATUS AND OPERATION METHOD THEREOF

CROSS-REFERENCES TO RELATED APPLICATION

The present application claims priority under 35 U.S.C. § 119(a) to Korean application number 10-2019-0030315, filed on Mar. 18, 2019, which is incorporated herein by reference in its entirety.

BACKGROUND

1. Technical Field

Various embodiments of the present disclosure may generally relate to a semiconductor integrated device, more particularly, to a memory system, computing apparatus, and operation method thereof.

2. Related Art

A storage device may perform operations for inputting or outputting data in accordance with requests of the host device electrically connected with the storage device. The storage device may use various types of storage medium for storing data.

Map data required for synchronizing the storage device with the host device may be data for storing mapping relations between a logical address used in the host device and a physical address used in the storage device.

The map data may be generally managed in the storage device. In order to improve response speed, a technology for uploading (caching) the map data in a memory of the host device may be considered.

However, a map data storage region in the storage device may not coincide with a map data storage region in the host device. For example, a size of the map data storage region in the storage device may be different from a size of the map data storage region in the host device. Thus, it may be required to effectively synchronize the map data.

SUMMARY

In example embodiments of the present disclosure, a memory system may include a storage device and a controller. The storage device may include a non-volatile memory device. The controller may include a device memory. The controller may control operations of the non-volatile memory device in accordance with a request of a host device, wherein the controller includes a map data management circuit configured to: cache one or more segments from a plurality of map segment groups stored in the storage device, each segment having information including a reference count and mapping relationships between logical addresses and physical addresses; detect, among the one or more cached segments, an upload target segment in which the reference count is greater than a predetermined count; and transmit, when a predetermined number or greater of upload target segments are detected within a first map segment group, the predetermined number or greater of upload target segments to the host device.

In example embodiments of the present disclosure, a computing apparatus may include a host device and a data storage device. The host device may include a host memory. The data storage device may include a controller and a storage device. The controller may communicate with the host device and including a device memory; and a storage device including a non-volatile memory device, wherein the controller includes a map data management circuit configured to: cache one or more segments from a plurality of map segment groups stored in the storage device, each segment having information including a reference count and mapping relationships between logical addresses and physical addresses; detect, among the cached segment, an upload target segment having a reference count greater than a predetermined count; and transmit, when a predetermined number or greater of upload target segments are detected within a first map segment group, the predetermined number or greater of upload target segments to the host device.

In example embodiments of the present disclosure, according to a method of operating a memory system, the memory system may include a storage device and a controller. The storage device may include a non-volatile memory device. The controller may include a device memory. The controller may control operations of the non-volatile memory device in accordance with a request of a host device. The controller caching, by the controller, one or more segments from a plurality of map segment groups stored in the storage device, each segment having information including a reference count and mapping relationships between logical addresses and physical addresses; detecting, by the controller, an upload target segment among the one or more cached segments having a reference count greater than a predetermined count; and transmitting, by the controller and when a predetermined number or greater of upload target segments are detected within a first map segment group, the predetermined number or greater of upload target segments to the host device.

In example embodiments of the present disclosure, an operating method of a controller, the operating method comprising: caching, in a controller cache memory, one or more map segments from first and second groups of map segments stored in a memory device; detecting, among the cached map segments, a target map segment having cache-hits greater than a threshold; caching, in a host cache memory, the target map segment of the first group when at least one map segment of the first group is cached in the host cache memory; caching, in the host cache memory, a predetermined number of the target map segments of the second group when any map segment of the second group is not cached in the host cache memory, wherein the controller cache memory is included in the controller and the host cache memory is included in a host, and wherein the host provides, by referring to the map segments cached in the host cache memory, the controller with a physical address indicating a storage location within the memory device.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plane illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
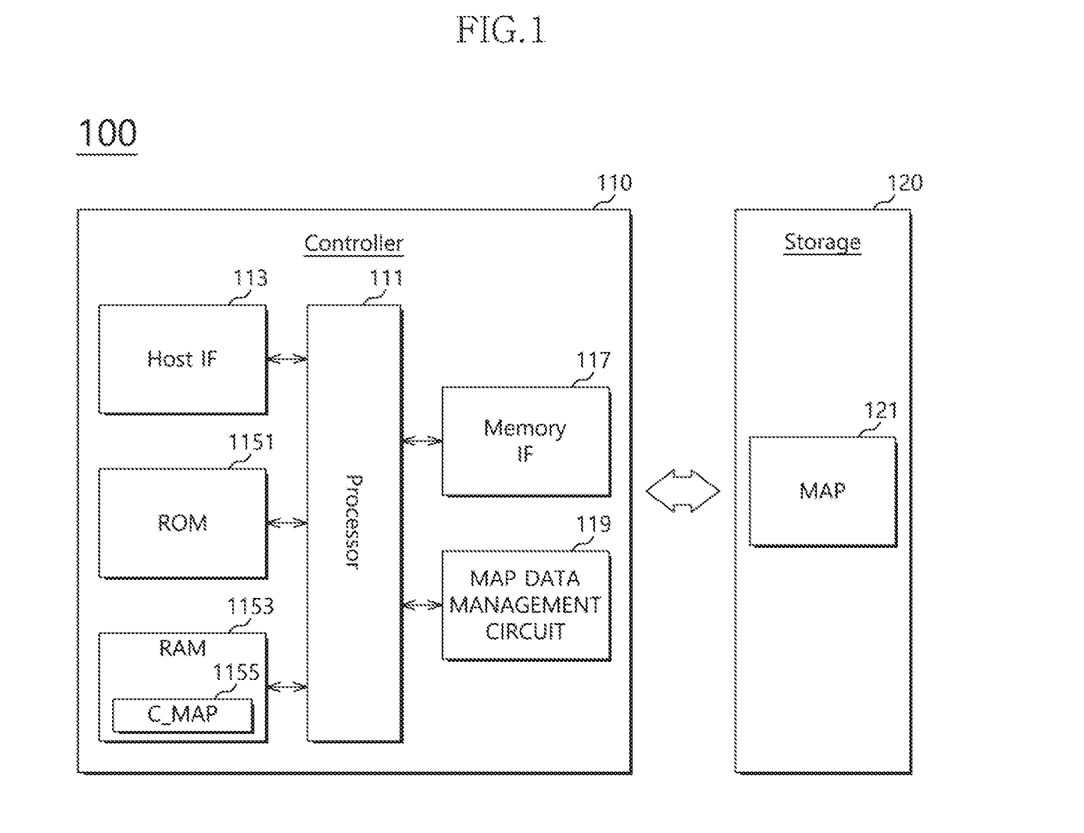
FIG. 1 is a block diagram illustrating a memory system in accordance with example embodiments.

FIG. 1 is a block diagram illustrating a memory system in accordance with example embodiments.

Referring to FIG. 1, a memory system 100 may include a controller 110 and a storage device 120.

The controller 110 may include a processor 111, a host interface 113, an ROM 1151, a RAM 1153, a memory interface 117 and a map data management circuit 119.

As used in the disclosure, the term 'circuit' may refer to combinations of circuits and software (and/or firmware) as applicable and depending on design, and would also cover an implementation of merely a processor (or multiple processors) or portion of a processor and its (or their) accompanying software and/or firmware.

The processor 111 may transmit various types of control information required in a reading operation and a writing operation of data with respect to the storage device 120 to the host interface 113, the RAM 1153 and the memory interface 117. For example, the processor 111 may read a firmware or a software code provided for various operations of the memory system 100 from the storage device 120. The processor 111 may load the read firmware or software code into the RAM 1153. The processor 111 may interpret and perform the loaded firmware and software code to control the operations of the memory system 100.

For example, the processor 111 may have a flash translation layer (FTL) function such as a garbage collection, an address mapping, a wear leveling for managing the storage device 120, a function for detecting and correcting an error in the data read from the storage device 120.

The host interface 113 may provide a communication channel for receiving a command, an address, data and a clock signal from a host device (for example, host device 10 shown in FIG. 2) in accordance with the controls of the processor 111, and for controlling input/output operations of the data. The host interface 113 may provide a physical connection between the host device and a storage device 120. The host interface may be interfaced with the storage device 120 corresponding to a bus format of the host device. The bus format of the host device may include at least one of a standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer interface (SCSI), a serial attached SCSI (SAS), a peripheral component interconnection (PCI), a PCI express (PCI-E), a universal flash storage (UFS), etc.

The ROM 1151 may store program codes required for the operations of the controller 110 such as the firmware or the software, and code data used by the program codes.

The RAM 1153 may temporarily store data required for the operations of the controller 110, data generated by the controller 110, and data transmitted between the host device and the storage device 120.

The processor 111 may load boot codes in the storage device 120 or the ROM 1151 into the RAM 1153 during a booting operation to control the booting operation of the memory system 100.

The memory interface 117 may provide a communication channel for transmitting signals between the controller 110 and the storage device 120. The memory interface 117 may write data temporarily stored in the RAM 1153 or a buffer memory in the storage device 120 in accordance with the control of the processor 111. The memory interface 117 may transmit read data to the RAM 1153 or the buffer memory. The read data may be temporarily stored in the RAM 1153 or the buffer memory.

The storage device 120 may include a memory device such as an electrically erasable and programmable ROM (EEPROM), a NAND flash memory, a NOR flash memory, a phase-change RAM (PRAM), a resistive RAM (ReRAM), a ferroelectric RAM (FRAM), a spin torque transfer magnetic RAM (STT-MRAM), etc. The storage device 120 may include a plurality of dies (Die 0~Die n), a plurality of chips or a plurality of packages. The storage device 120 may include a single-level cell for storing one bit of data in one memory cell or a multi-level cell for storing a plurality of bits of data in one memory cell.

The controller 110 may manage various meta-data required for managing the storage device 120. The meta-data may be stored in the storage device 120. The controller 110 may read and use the meta-data from the storage device 120 when the meta-data may be necessary.

In example embodiments, the meta-data may include a map data MAP. The map data MAP may be stored in a map data region 121 of the storage device 120. The map data MAP may be managed by the processor 111 or the map data management circuit 119 of the controller 110.

The map data MAP may include mapping information between physical addresses of storage spaces in the storage device 120 and logical addresses provided to the memory system 100 by the host device. The map data management circuit 119 may cache, among the map data MAP stored in the meta-data region 121 of the storage device 120, map data onto a device memory 1155 (for example, the RAM 1153 or the buffer memory) of the controller 110 as map cache data C_MAP. The cached map data may be included in the request of the host device or may be required for performing background operations of the memory system 100.

For example, the device memory 1155 may be a static random access memory (SRAM). When the map data MAP may be updated in performing the operation by the request of the host device or the background operation, the map data management circuit 119 may reflect the updated map data on the storage device 120.

The map data management circuit 119 may transmit all or a part of the map data MAP to the host device 100. The host device may cache all or the part the map data MAP transmitted from the memory system 100 as host map cache data H_MAP. Thus, the host device may transmit a read request including a physical address to the memory system 100 by referring to the host map cache data H_MAP. By the read request including the physical address, the controller 110 of the memory system 100 may not perform an address conversion operation or a read operation for reading the map data MAP from the storage device 120. Thus, a time of the memory system 100 for processing the request of the host device may be decreased to improve an operational speed of a computing apparatus 1.

In example embodiments, the map data management circuit 119 may classify logical addresses LBA into a plurality of logical address groups LBAG. The map data management circuit 119 may then divide each of the logical address groups LBAG into a plurality of segments SEG0_0~SEG0_M, SEG1_0~SEG1_M, . . . . Each of the segments may include plural pieces of information each representing mapping relations between a logical address LBA and a physical address PBA, properties of data in a corresponding physical storage space such as sequential data, random data, etc., reference count of a corresponding logical storage space, etc.

The map data management circuit 119 may detect, within the map cache data C_MAP, an upload target segment which is referred to (i.e., cache-hit) a predetermined count TH2 of times. The map data management circuit 119 may transmit the detected upload target segment to a host memory 13 of the host device.

When the upload target segment belongs to a particular logical address group LBAG and another segment belonging to the particular logical address group LBAG is already cached in the host memory 13, the map data management circuit 119 may transmit the upload target segment of the particular logical address group LBAG to the host memory 13. The transmitted upload target segment of the particular logical address group LBAG may be stored in a host region in which the other segments of the particular logical address group LBAG is cached within the host memory 13.

In contrast, when the upload target segment belongs to a particular logical address group LBAG but any segment belonging to the particular logical address group LBAG is not cached in the host memory 13, the map data management circuit 119 may put off transmitting the upload target segment belonging to the particular logical address group LBAG until a predetermined number TH1 or a number greater than upload target segments belonging to the particular logical address group LBAG are detected.

Figure 2:
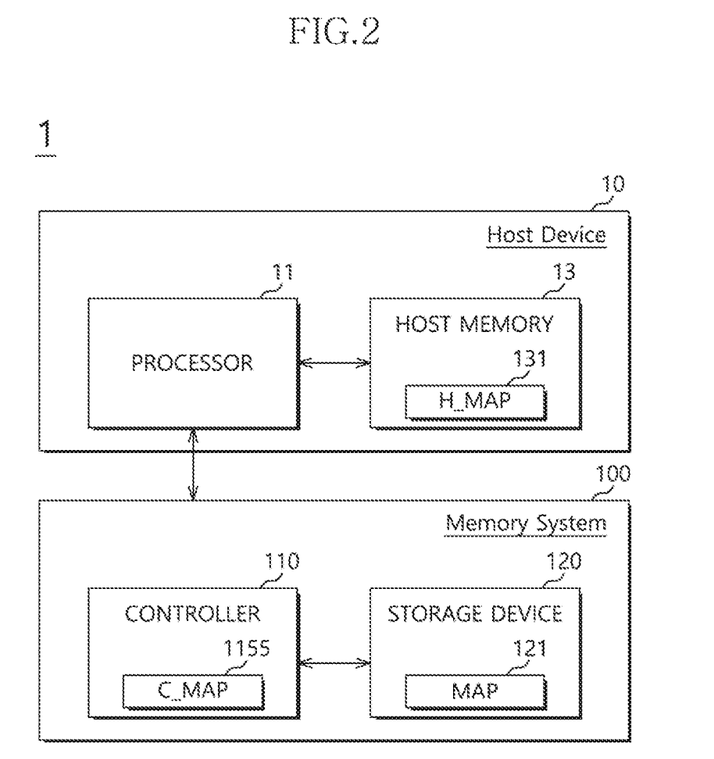
FIG. 2 is a block diagram illustrating a computing apparatus in accordance with example embodiments.

FIG. 2 is a block diagram illustrating a computing apparatus in accordance with example embodiments.

Referring to FIG. 2, a computing apparatus 1 may include a host device 10 and a memory system 100.

The host device 10 may include a processor 11 and a host memory 13.

The processor 11 may control operations of the computing apparatus 1. The processor 11 may be a hardware-based data processing device including circuits for performing commands in codes or programs.

The host memory 13 may include a main memory of the host device 10 communicated with the processor 11 or the computing apparatus 1. The host memory 13 may temporarily store code and data performed and referenced by the processor 11. The processor 11 may perform the codes such as an operating system, applications, etc., and process the data using the host memory 13. The host memory 13 may include a random access memory including a volatile memory device such as a static RAM (SRAM), a dynamic RAM (DRAM), a synchronous DRAM (SDRAM), etc., and a non-volatile memory device such as a phase-change RAM (PRAM), a magnetic RAM (MRAM), a resistive RAM (ReRAM), a ferroelectric RAM (FRAM), etc.

Although not depicted in drawings, the host device 10 may be communicated with a user through a user's interface. In example embodiments, the user's interface may include an input interface such as a keyboard, a keypad, a button, a touch panel, a touch screen, a touch ball, a camera, a microphone, a gyroscope sensor, a vibration sensor, etc., and an output interface such as a liquid crystal display (LCD), an organic light emitting diode (OLED), an active matrix OLED (AMOLED), an LED, a speaker, a monitor, etc.

The host device 10 may further include a modem connected between the computing apparatus 1 and external devices through various wires or wireless communication protocols.

The memory system 100 may include a controller 110 and a storage device 120. In example embodiments, the memory system 100 may be substantially the same as the memory system 100 in FIG. 1. The memory system 100 may be communicated with the processor 11 through the host interface 113. The host device 10 may store data required for long term storing in the memory system 100. The memory system 100 may store source codes of various software such as boot images, operating systems, applications, etc., for driving the computing apparatus 1 and data processed by the source codes.

The map data MAP including the mapping information between the physical addresses of the storage space in the storage device 120 and the logical addresses provided to the memory system 100 by the host device 10 may be stored in the meta-data region 121 of the storage device 120.

The controller 110 may cache, among the map data MAP stored in the meta-data region 121 of the storage device 120, map data as the map cache data C_MAP onto the device memory 1155 of the controller 110.

When the map data MAP may be updated in performing the operation by the request of the host device 10 or the background operation, the controller 110 may reflect the updated map data on the storage device 120.

The controller 110 may transmit all or a part of the map data MAP to the host device 10. The host device 10 may cache, as the host map cache data H_MAP, the map data MAP transmitted from the memory system 100 in the host map region 131 of the host memory 13.

Thus, the host device 10 may transmit the read request including a physical address to the memory system 100 by referring to the host map cache data H_MAP in the host memory 13. Therefore, the controller 110 of the memory system 100 may skip the address conversion operation or the read operation for reading the map data MAP from the storage device 120. As a result, the time of the memory system 100 for processing the request of the host device 10 may be decreased to improve an operational speed of the computing apparatus 1.

The host map cache data H_MAP cached in the host memory 13 may be managed by the memory system 100 or the host device 10. When the host device 10 may manage the host map cache data H_MAP, various kinds of the memory systems 100 may be applied to the computing apparatus 1, because it may not be required to transfer a management authority of the host memory 13 to the memory system 100.

Figure 3:
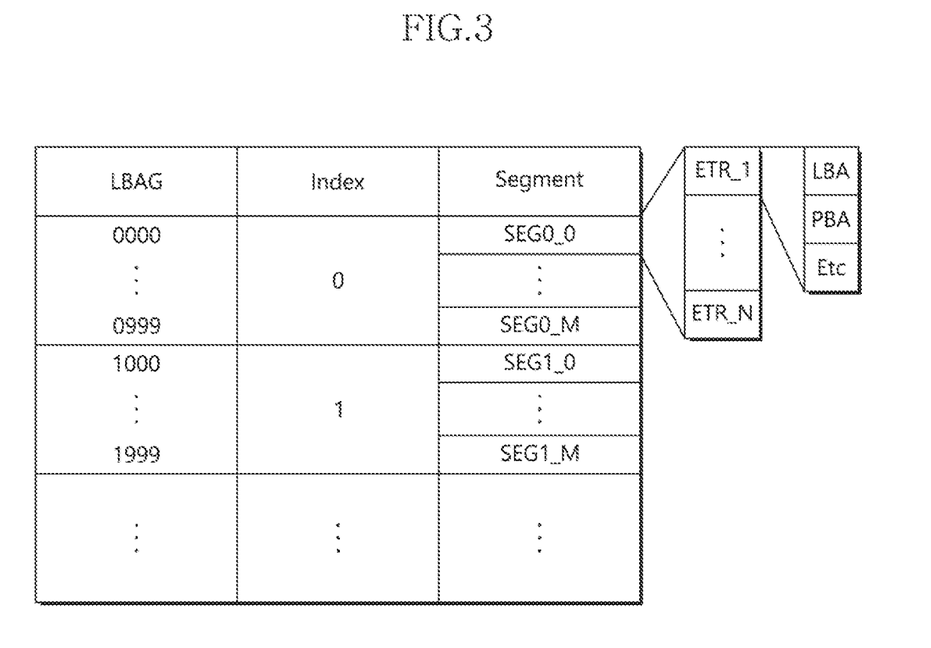
FIG. 3 is a view illustrating operations for managing map data of a memory system in accordance with example embodiments.

FIG. 3 is a view illustrating of operations for managing map data of a memory system in accordance with example embodiments.

Referring to FIGS. 1 to 3, the controller 110, particularly, the map data management circuit 119 may map the logical storage space identified by the logical addresses and the physical storage space identified by the physical addresses using the map data MAP.

The map data management circuit 119 may classify the logical addresses LBA into the plurality of the logical address groups LBAG. Indexes R_Index may be allocated to the respective logical address groups LBAG. In example embodiments, a logical address group LBAG0 to which an index 0 may be allocated may include map data with respect to the logical addresses LBAs "0000" to "0999". Similarly, a logical address group LBAG1 to which an index 1 may be allocated may include map data with respect to the logical addresses LBAs "1000" to "1999".

Each of the logical address groups LBAG may be divided into the plurality of segments SEG0_0~SEG0_M, SEG1_0~SEG1_M, .... Map data selected from the map data MAP in the storage device 120 may be loaded into the device memory 1155 of the controller 110 as the map cache data C_MAP. In order to store the map cache data C_MAP, the controller 110 may allocate one or more device sub-regions SR having a predetermined size within the device memory 1155. The size of a single device sub-region SR may correspond to a size of a single segment. Thus, the map cache data C_MAP may be cached in the controller 110 by a unit of the segment, or a unit of the device sub-region SR allocated within the device memory 1155.

Each of the segments SEG0_0~SEG0_M, SEG1_0~SEG1_M, . . . may include a plurality of entries ETR_1~ETR_N. Each of the entries ETR_1~ETR_N may include the logical addresses LBA, the physical addresses PBA, and other information.

The controller 110 may store the plurality of the entries ETR_1~ETR_N as one segment.

As mentioned above, the map data MAP may include the plurality of the entries ETR_1~ETR_N. Each of the entries ETR_1~ETR_N may include information representing the mapping relations between the logical address LBA for identifying one unit logical storage space and the physical address PBA for identifying one unit physical storage space, and another information. The another information may include the properties of the data in the corresponding physical storage space such as sequential data, random data, etc., reference count of the corresponding logical storage space, etc.

The map data management circuit 119 may transmit the map data selected from the map cache data C_MAP cached in the device memory 1155 of the controller 110 to the host memory 13 of the host device 10.

In order to cache the map cache data C_MAP in the host memory 13, the host device 10 may allocate at least one host sub-region R having a predetermined size within the host map region 131 of the host memory 13. The size of the host sub-region R allocated within the host memory 13 may be Y times a size of the device sub-region SR of the host device 10. Thus, when a single segment is cached as the map cache data C_MAP in a single device sub-region SR, Y numbers of segments may be cached as the host map cache data H_MAP in a single host sub-region R. In example embodiments, at least one segment belonging to a single logical address group LBAG may be cached in a single host sub-region R allocated within the host memory 13.

When the at least one segment is detected as an upload target segment to be uploaded into the host device 10, the host device may allocate the host sub-region R within the host memory 13 for the upload target segment. When the host memory 13 may not have a space for a new upload target segment, a host sub-region R previously allocated for a segment may be released and the released host sub-region R may be allocated for the new upload target segment. The releasing and re-allocating of the host sub-region R may be performed according to various schemes such as the least recently used (LRU) scheme, the least frequently used (LFU) scheme, and so forth.

In example embodiments, when an individual upload target segment is transmitted to be cached into the host device 10, allocating the host sub-region R within the host memory 13 so as to store the individual segment may cause a waste of the host memory 13. Thus, when a predetermined number TH1 or greater of the upload target segments are detected, the host sub-region R may be allocated within the host memory 13 to store the predetermined number TH1 or greater of the upload target segments.

In example embodiments, when at least one segment belonging to a specific logical address group LBAG may be cached in the host sub-region R, an upload target segment also belonging to the specific logical address group LBAG may be detected. In this case, the upload target segment may be transmitted to be cached in the host sub-region R in which the segment belonging to the specific logical address group LBAG is cached.

In contrast, when the upload target segment belongs to a specific logical address group LBAG but any segment belonging to the specific logical address group LBAG is not cached in the host device 10, the map data management circuit 119 may put off transmitting individual upload target segment to the host device 10 until the predetermined number TH1 or greater of the upload target segments belonging to the specific logical address group LBAG are detected.

Therefore, an unnecessary region may not be allocated to the host memory 13. As a result, the allocated region may be effectively used to improve management efficiency of the host memory 13.

Figure 4:
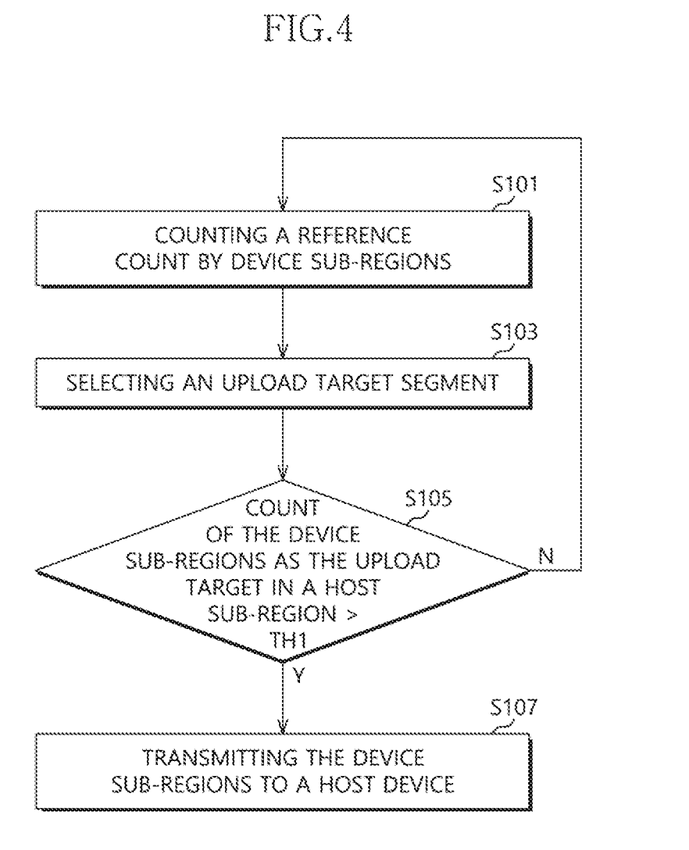
FIG. 4 is a flow chart illustrating a method of operating a memory system in accordance with example embodiments.
Figure 5:
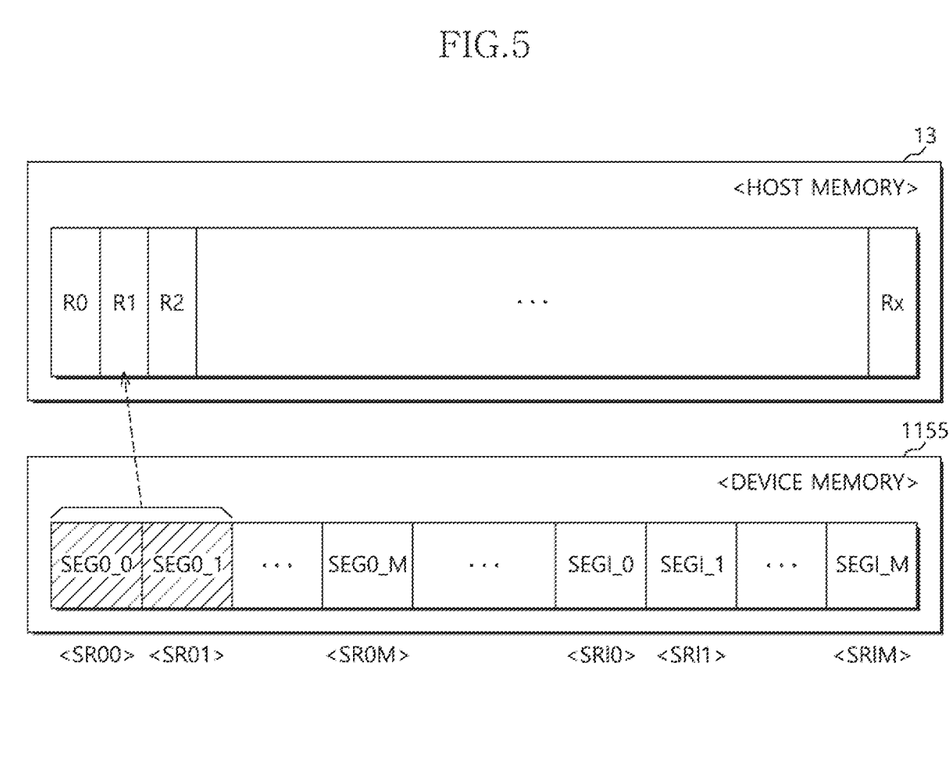
FIG. 5 is a view illustrating a method of operating a memory system in accordance with example embodiments.

FIG. 4 is a flow chart illustrating a method of operating a memory system in accordance with example embodiments, and FIG. 5 is a view illustrating a method of operating a memory system in accordance with example embodiments.

Referring to FIG. 4, in step S101, the controller 110 may count the reference count RC of a corresponding segment stored in each device sub-region SR of the device memory 1155 in which the map cache data C_MAP is stored.

In step S103, the controller 110 may detect a segment in the device sub-region SR having the reference count RC of the predetermined count TH2 or greater as the upload target segment in accordance with count results.

In step S105, the controller 110 may determine, when the upload target segment belongs to a particular logical address group LBAG, whether the predetermined number TH1 or greater of upload target segments belonging to the particular logical address group LBAG is detected.

When the predetermined number TH1 or greater of upload target segments belonging to the particular logical address group LBAG is detected (that is, 'Y' at step S105), the predetermined number TH1 or greater of upload target segments belonging to the particular logical address group LBAG may be transmitted to the host memory 13 of the host device 10 at step S107.

The host device 10 may allocate the host sub-region R within the host memory 13 to store the predetermined number TH1 or greater of upload target segments belonging to the particular logical address group LBAG and transmitted from the controller 110.

In contrast, when the predetermined number TH1 or greater of upload target segments belonging to the particular logical address group LBAG are not yet detected (that is, 'N' at step S105), steps S101 to S105 may be repeated.

Referring to FIG. 5, the host sub-regions R1~Rx are allocated within the host memory 13. Further, the device sub-regions SR00~SR0M, . . . , SRI0~SRIM are allocated within the device memory 1155 of the controller 110. Thus, the map cache data C_MAP or the segments SEG0_0~SEG0_M, . . . , SEGI_0~SEGI_M may be stored in the device sub-regions SR00~SR0M, . . . , SRI0~SRIM, respectively. For example, the segments SEG0_0~SEG0_M respectively stored in the device sub-regions SR00~SR0M may correspond to a zero-th logical address group LBAG and the segments SEGI_0~SEGI_M respectively stored in the device sub-regions SRI0~SRIM may correspond to a I-th logical address group LBAG.

When the predetermined number TH1 is two and the segments SR0_0 and SR0_1 belonging to the zero-th logical address group LBAG among the total segments SEG0_0~SEG0_M, . . . , SEGI_0~SEGI_M respectively stored in the device sub-regions SR00~SR0M, . . . , SRI0~SRIM are selected as the upload target segments, any one R1 of the host sub-regions R1~Rx may be allocated for the upload target segments SR0_0 and SR0_1. Thus, the upload target segments SR0_0 and SR0_1 may be transmitted and cached into the host sub-region R1.

When only one segment SR0_0 is detected as the upload target segment and the predetermined number TH1 is two, the transmission and caching of one segment SR0_0 to the host memory 13 may be put off. When the two segments SR0_0 and SR0_1 (or more) belonging to the zero-th logical address group LBAG are detected as the upload target segments, the segments SR0_0 and SR0_1 of the predetermined number TH1 (or greater) belonging to the zero-th logical address group LBAG may be transmitted and cached to the host memory 13 to effectively use the host memory 13.

Figure 6:
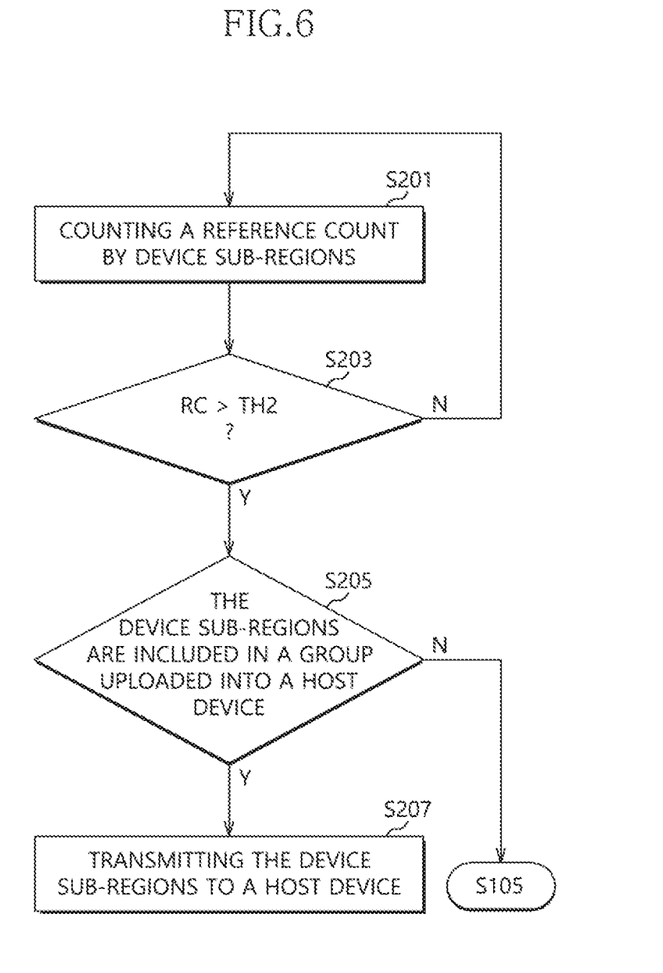
FIG. 6 is a flow chart illustrating a method of operating a memory system in accordance with example embodiments.
Figure 7:
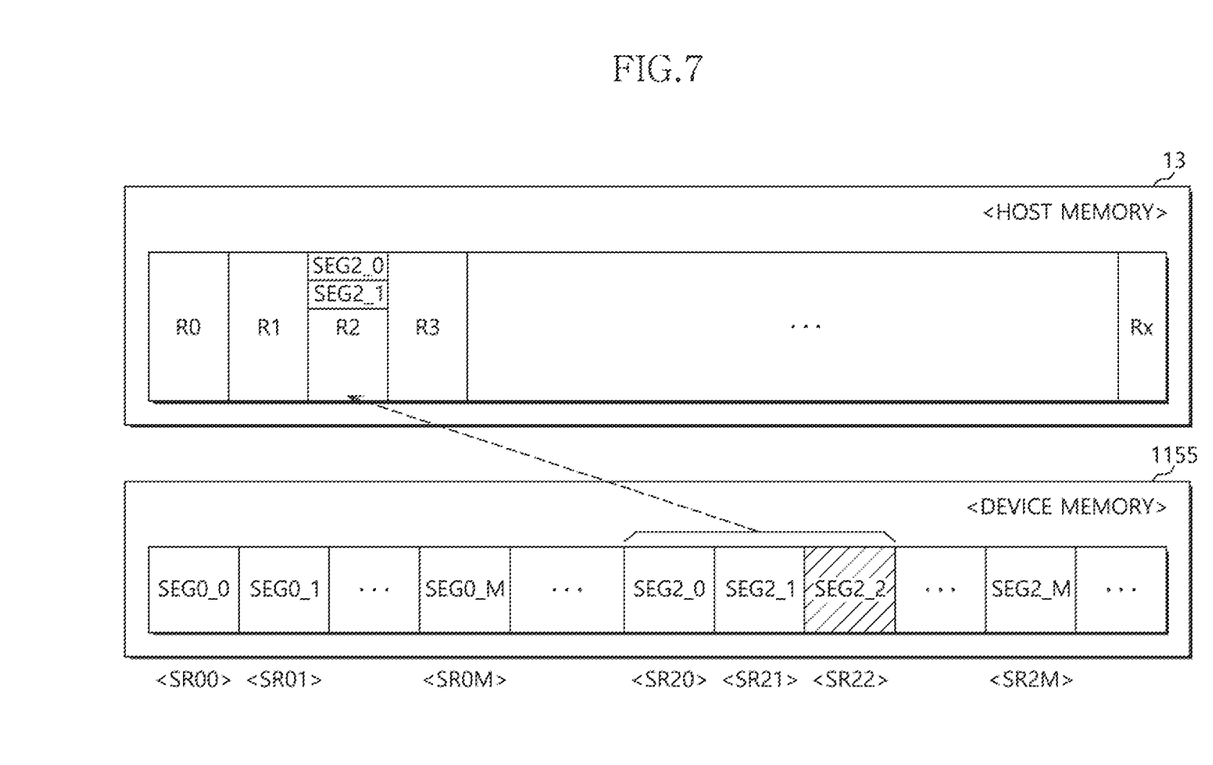
FIG. 7 is a view illustrating a method of operating a memory system in accordance with example embodiments.

FIG. 6 is a flow chart illustrating a method of operating a memory system in accordance with example embodiments, and FIG. 7 is a view illustrating a method of operating a memory system in accordance with example embodiments.

Referring to FIG. 6, in step S201, the controller 110 may count the reference counts RC of segments SEG0_0~SEG0_M, . . . , SEG2_0~SEG2_M, . . . respectively stored in the device sub-region SR00~SR0M, . . . , SR20~SR2M.

In step S203, the controller may detect the upload target segment having the reference count RC of above the predetermined count TH2 in accordance with count results.

When the upload target segment is not detected, in step S201, the controller 110 may repeat steps S201 and S203.

When the upload target segment belonging to a particular logical address group LBAG is detected (that is 'Y' at step S203), in step S205, the controller 110 may identify whether another segment belonging to the particular the logical address group LBAG is already cached to the host memory 13 or not.

When another segment belonging to the particular logical address group LBAG is already cached to the host memory 13 (that is, 'Y' at step S205), in step S207, the controller 110 may transmit the upload target segment to the host memory 13.

The host device 10 may store the upload target segment in the host sub-region R, in which the another segment belonging to the particular logical address group LBAG is already cached within the host memory 13.

In contrast, when any segment belonging to the particular logical address group LBAG is not yet cached in the host memory 13 (that is, 'N' at step S205), the step S105 in FIG. 4 may be performed to put off transmitting and caching the upload target segment to the host memory 13.

Referring to FIG. 7, the host sub-regions R1~Rx may be allocated within the host memory 13. Further, the segments SEG0_0~SEG0_M, . . . , SEG2_0~SEG2_M, . . . may be respectively stored in the device sub-regions SR00~SR0M, . . . , SR20~SR2M, . . . allocated within the device memory 1155.

The segments SEG2_0 and SEG2_1 belonging to a second logical address group LBAG among the total segments SEG0_0~SEG0_M, . . . , SEG2_0~SEG2_M, . . . respectively stored in the device sub-regions SR00~SR0M, . . . , SR20~SR2M, . . . may be already cached into the host sub-region R2.

Then, the segment SEG2_2 cached in the device sub-region SR22 and belonging to the second logical address group LBAG may be detected as the upload target segment having the reference count RC of no less than the predetermined count TH2.

Because the segments SEG2_0 and SEG2_1 belonging to the second logical address group LBAG are already cached in the host memory 13, the controller 110 may transmit the upload target segment SEG2_2 to be cached in the host sub-region R2 of the host memory 13. Therefore, an unnecessary region may not be allocated to the host memory 13. As a result, the host memory 13 may be effectively used.

Figure 8:
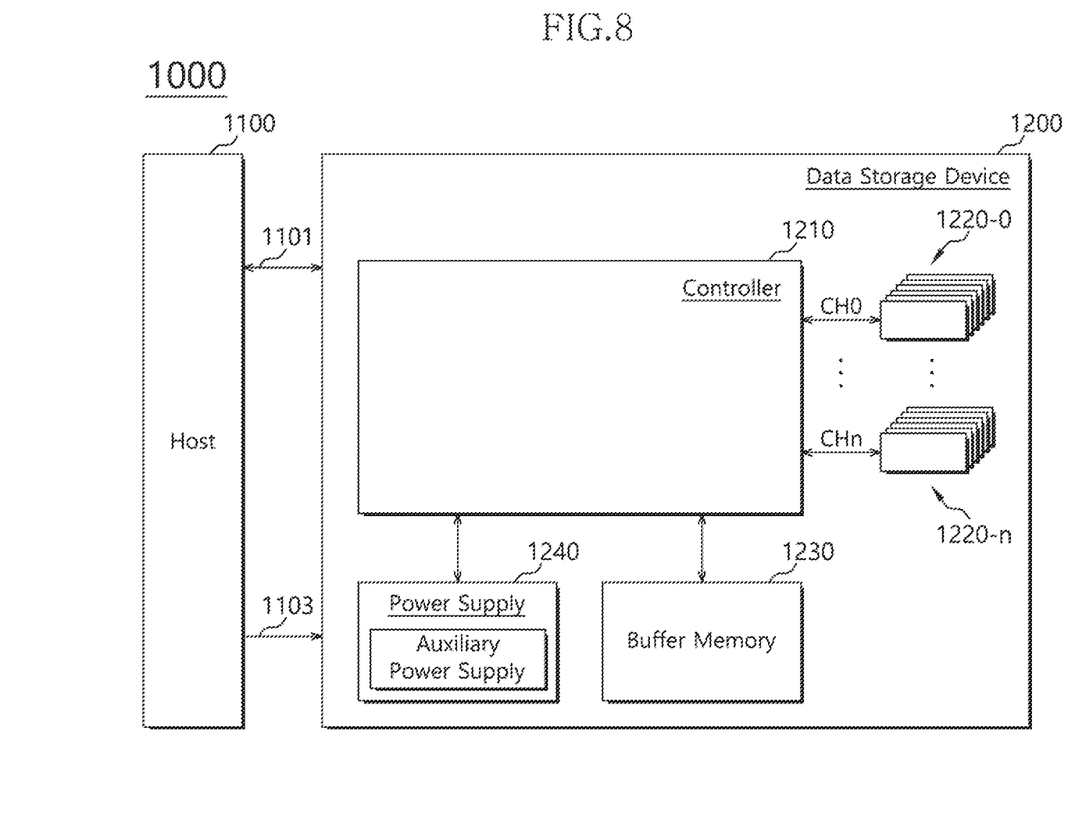
FIG. 8 is a diagram illustrating a data storage system in accordance with an embodiment.

FIG. 8 is a diagram illustrating a data storage system 1000, in accordance with an embodiment.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as the controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to a firmware or a software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 9:
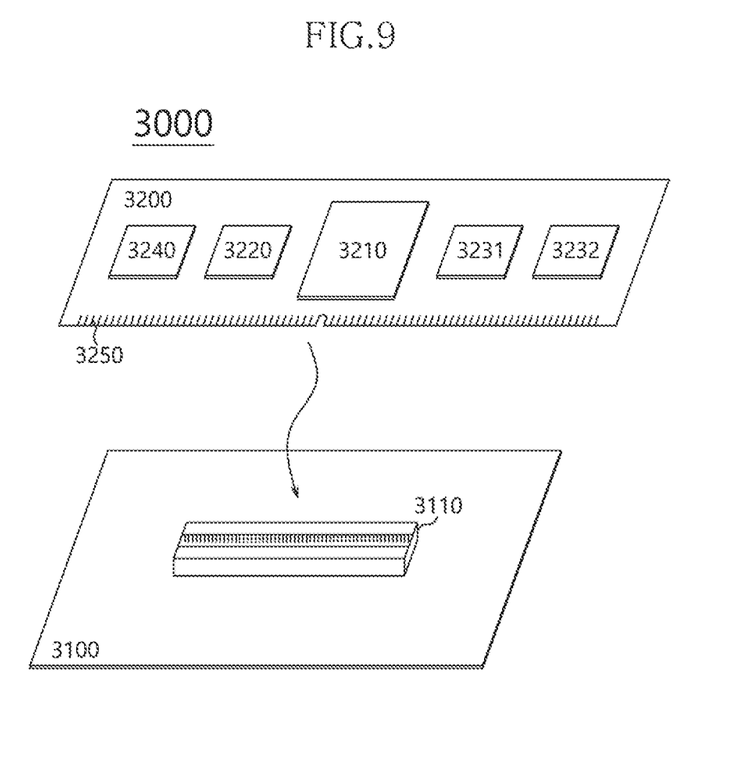
FIG. 9 and FIG. 10 are diagrams illustrating a data processing system in accordance with an embodiment.

FIG. 9 is a diagram illustrating a data processing system 3000, in accordance with an embodiment. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 10:
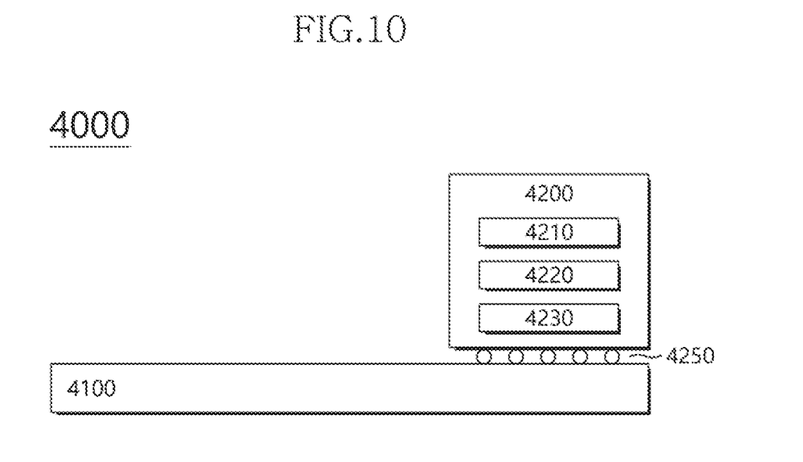

FIG. 10 is a diagram illustrating a data processing system 4000 in accordance with an embodiment. Referring to FIG. 10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
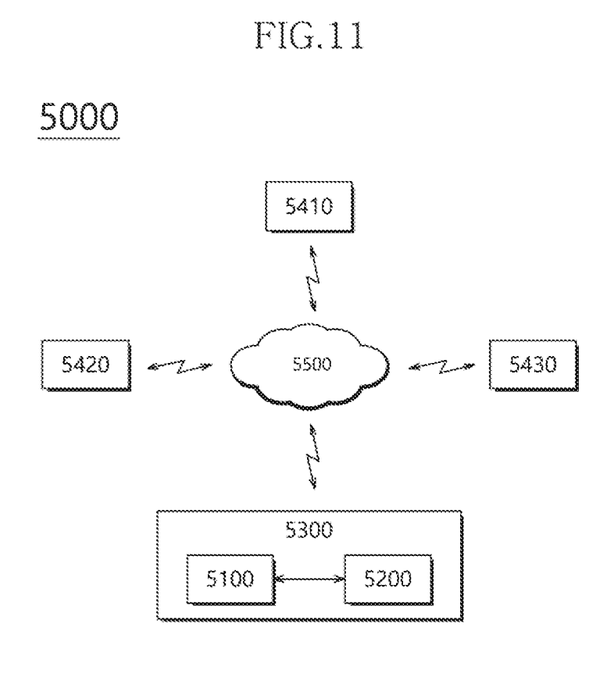
FIG. 11 is a diagram illustrating a network system including a data storage device in accordance with an embodiment.

FIG. 11 is a diagram illustrating a network system 5000 including a data storage device, in accordance with an embodiment. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 8, the memory system 3200 shown in FIG. 9, or the memory system 4200 shown in FIG. 10.

Figure 12:
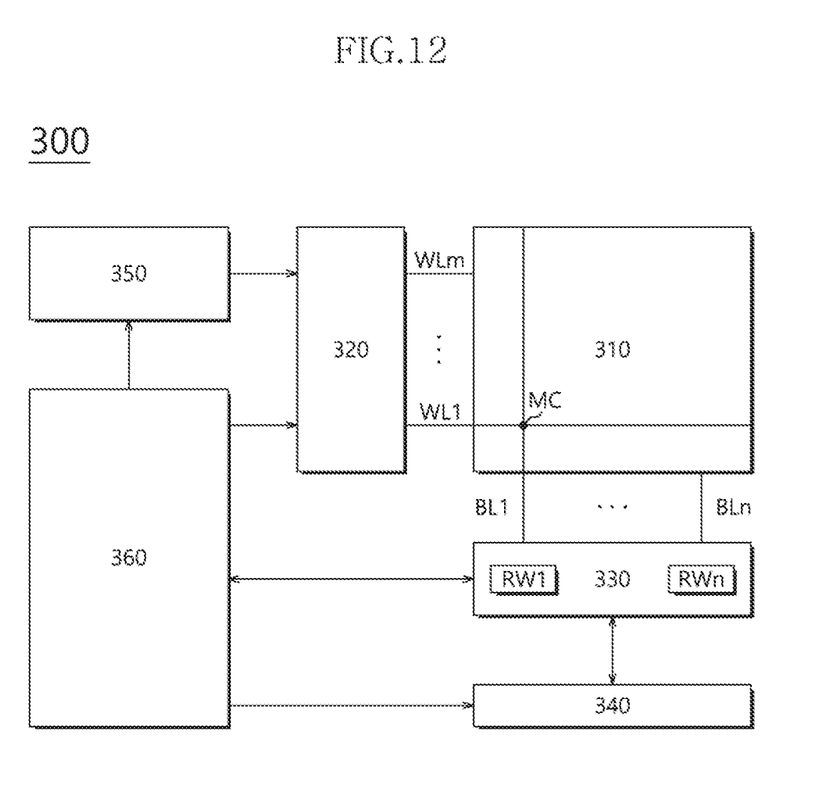
FIG. 12 is a block diagram illustrating a nonvolatile memory device included in a data storage device in accordance with an embodiment.

FIG. 12 is a block diagram illustrating a nonvolatile memory device 300 included in a data storage device, such as the data storage device 10, in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings. The memory cells comprised as NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array, memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

This specification and the drawings disclose the preferred embodiments of the present disclosure, and although specific terms are used, they are used in general meaning for purposes of easily describing technical contents of the present disclosure and understanding of the present disclosure, and are not intended to limit the scope of the present disclosure. It is apparent to those skilled in the art to which the present disclosure pertains that other modification examples based on the technical spirit of the present disclosure may be carried out in addition to the embodiments disclosed herein. Therefore, the scope of the present disclosure should not be limited to the described embodiments, but should be determined by the equivalents of the claims, as well as the following claims.

What is claimed is:

1. A memory system comprising:
a storage device including a non-volatile memory device; and
a controller including a device memory and configured to control operations of the non-volatile memory device in accordance with a request of a host device,
wherein the controller includes a map data management circuit configured to:
cache one or more segments from a plurality of map segment groups stored in the storage device, each segment having information including a reference count and mapping relationships between logical addresses and physical addresses, and also stored as meta-data;
detect, among the one or more cached segments, an upload target segment in which the reference count is greater than a predetermined count; and
transmit a number of upload target segments to the host device, when the number of upload target segments detected within a first map segment group is greater than or equal to a predetermined number.

2. The memory system of claim 1, wherein the map data management circuit further transmits the upload target segment of a second map segment group to the host device when another segment of the second map segment group is stored in the host device.

3. The memory system of claim 1, wherein the map data management circuit does not, when any segment of the first map segment group is not stored in the host device, transmit each upload target segment of the first map segment group to the host device until the number of upload target segments detected within the first map segment group is greater than or equal to the predetermined number.

4. A computing apparatus comprising:
a host device including a host memory; and
a data storage device including:
a controller configured to communicate with the host device and including a device memory; and a storage device including a non-volatile memory device,
wherein the controller includes a map data management circuit configured to:
cache one or more segments from a plurality of map segment groups stored in the storage device, each segment having information including a reference count and mapping relationships between logical addresses and physical addresses, and also stored as meta-data;
detect, among the cached segment, an upload target segment having a reference count greater than a predetermined count; and transmit a number of upload target segments to the host device when the number of upload target segments detected within a first map segment group is greater than or equal to a predetermined number.

5. The computing apparatus of claim 4, wherein the host device allocates a host sub-region having a predetermined size within the host memory to store the transmitted upload target segments.

6. The computing apparatus of claim 5, wherein the map data management circuit caches the segments in one or more device sub-regions allocated within the device memory, the device sub-region having a size different from the size of the host sub-region.

7. The computing apparatus of claim 6, wherein the size of the host sub-region is equal to or greater than a size of a map segment group.

8. The computing apparatus of claim 5, wherein the map data management circuit further transmits the upload target segment of a second map segment group to the host device when another segment of the second map segment group is stored in the host device.

9. The computing apparatus of claim 8, wherein the host device stores the upload target segment of the second map segment group in the host sub-region storing the another segment of the second map segment group.

10. The computing apparatus of claim 4, wherein the map data management circuit does not, when any segment of the first map segment group is not stored in the host device, transmit each upload target segment of the first map segment group until the number of upload target segments detected within the first map segment group is greater than or equal to the predetermined number.

11. A method of operating a memory system, the memory system including a storage device and a controller, the storage device including a non-volatile memory device, and the controller including a device memory and configured to control operations of the non-volatile memory device in accordance with a request of a host device, the method comprising:
caching, by the controller, one or more segments from a plurality of map segment groups stored in the storage device, each segment having information including a reference count and mapping relationships between logical addresses and physical addresses, and also stored as meta-data;
detecting, by the controller, an upload target segment among the one or more cached segments having a reference count greater than a predetermined count; and
transmitting, by the controller, a number of upload target segments to the host device when the number of upload target segments detected within a first map segment group is greater than or equal to a predetermined number.

12. The method of claim 11, further comprising storing, by the host device, the transmitted upload target segments in a host-sub-region having a predetermined size within a host memory included in the host device.

13. The method of claim 12,
wherein the segment is cached in a device sub-region allocated within the device memory, and
wherein a size of the device sub-region is different from the size of the host sub-region.

14. The method of claim 13, wherein the size of the host sub-region is equal to or greater than a size of a map segment group.

15. The method of claim 11, further comprising transmitting, by the controller, the upload target segment of a second map segment group to the host device when another segment of the second map segment group is stored in the host device.

16. The method of claim 15, further comprising storing, by the host device, the upload target segment of the second map segment group in the host sub-region storing the another segment of the second map segment group.

17. The method of claim 11, wherein the transmitting the number of upload target segments includes not transmitting, by the controller and when any segment of the first map segment group is not stored in the host device, each upload target segment of the first map segment group until the number of upload target segments detected within the first map segment group is greater than or equal to the predetermined number.

* * * * *